United States Patent Office 3,379,686
Patented Apr. 23, 1968

3,379,686
PROCESS FOR PRODUCING HIGH MOLECULAR WEIGHT POLYBENZOXAZINE DIONES
Ludwig Bottenbruch, Krefeld-Bockum, and Hermann Schnell, Krefeld-Urdingen, Germany, assignors to Farbenfabriken Bayer Aktiengesellschaft, Leverkusen, Germany, a corporation of Germany
No Drawing. Filed Sept. 29, 1965, Ser. No. 491,435
6 Claims. (Cl. 260—47)

ABSTRACT OF THE DISCLOSURE

Production of polybenzoxazine diones by forming a polyamide by the reaction of an aromatic dicarboxylic acid with a diamine and then reacting the polyamide with a carbonic acid derivative.

The invention relates to a process for the production of poly-1,3-benzoxazine-2,4-diones of high molecular weight. It is known that 1,3-benzoxazine-2,4-diones of the general formula

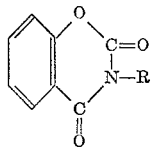

R=H, alkyl or aryl can be prepared by condensation of salicyclic acid amides with derivatives of carbonic acid, such as phosgene, chlorocarbonic acid esters or diesters of carbonic acid. The same compounds of the above formula can also be obtained by reaction of salicyclic acid esters with isocyanates or carbamic acid chlorides (A. Einhorn and C. Mettler, Berichte 35 (1902) 3647).

It has been found that poly-1,3-benzoxazine-2,4-diones of high molecular weight are obtained if polyamides of aromatic di-(o-hydroxy)-aryl dicarboxylic acids and diamines are reacted with those derivatives of carbonic acid which have an acylating action.

Suitable as starting materials for the preparation thereof are for example the following di-o-hydroxy-aryl dicarboxylic acids or their esters: 4,4'-dihydroxy-diphenyl-3,3'-dicarboxylic acid, 3,6-dihydroxyphthalic acid, resorcinol-2,4-dicarboxylic acid, resorcinol - 4,6 - dicarboxylic acid, 2,5-dihydroxyterephthalic acid, 4,4'-dihydroxydiphenyl methane-3,3'-dicarboxylic acid, 4,4' - dihydroxy-5,5'-dimethyldiphenylmethane-3,3'-dicarboxylic acid and 1,1'-(4,4'-dihydroxy-5,5'-dimethyldiphenyl)-ethane - 3,3'-dicarboxylic acid.

The following are for example suitable as diamines: 1,4-tetramethylene diamine, 1,6-hexamethylene diamine, 1.11-undecamethylene diamine, benzidine, 4,4'-diamino-diphenyl methane, 2,2-(4,4'-diamino-diphenyl)-propane, m-xylylene diamine, 4,4'-diaminodiphenyl ether, p-xylylenediamine, m-bis-(2-aminoethyl)-benzene and p-bis-(2-aminoethyl)-benzene.

The polyamides are prepared in accordance with the processes usual for the preparation of polyamides. These polyamides are then reacted with carbonic acid derivatives, such as phosgene, alkyl- or aryl-chloroformic acid esters or diesters of carbonic acid, as for example chloroform ethylate, chloroform phenylate, diphenyl carbonate. The conversion with diaryl carbonates proceeds particularly smoothly with the oxyaryl compound being split off. On account of the high melting points of the polyamides or polybenzoxazines, it is frequently desirable to carry out the process in solution, phenols and cresols being for example suitable as solvents. The reaction of the polyamides in the melt to form the polybenzoxazine diones can be carried out at temperatures from 150°–350° C. The reaction advantageously is effected at temperatures from 250–350° C. The reaction can be catalysed with basic substances, such as sodium methylate, sodium phenylate and sodium acetate.

Aliphatic amines, such as N,N'-dimethyl stearyl amine, N,N',N,N'-tetramethyltetramethylene diamine and N,N', N,N'-tetramethylhexamethylene diamines are also suitable as catalysts.

Furthermore, it is advantageous to convert the polyamides into polybenzoxazine diones with alkyl- or better still arylchloroformic acid esters in solution and in the presence of an acid-combining agent, such as pyridine, at temperatures between approximately 0 and 50° C. Tetrahydrofuran, dimethylformamide, tetrachlorethane and dichlorobenzene can for example be used as solvents.

The initially formed polyaryl carbonate of the polyamide is further condensed with phenol being split off to form the polybenzoxazine, which is thereafter isolated from the reaction mixture.

According to the intrinsic viscosities $(n_R)$-measured from a 1 percent by weight solution of the polybenzoxazine dione in m-cresol at $+25°$ C. in an Ubbelohde viscosimeter, the polybenzoxazine diones have a molecular weight of at least 10,000.

One preferred embodiment of the aforementioned process is as follows: the polyamide is dissolved in a solvent mixture consisting of pyridines and o-dichlorobenzene, and chloroform phenylate dissolved in o-dichlorobenzene is added dropwise at a temperature of about 0° C. The procedure adopted is for example in accordance with one of the following processes:

Either the solid is filtered off from the precipitated pyridine hydrochloride and the solvent is thereafter distilled in vacuo until all the pyridine hydrochloride still dissolved has distilled over (for example, by adding methanol to the remaining solution, the polybenzoxazines can be obtained in solid form), or the reaction mixture is mixed with the same volume of methanol, is stirred for half an hour, is suction filtered from the precipitated reaction product and the latter is washed several times with methanolic aqueous hydrochloric acid, then with methanol and dried.

The formation of the polybenzoxazines can easily be proved by infrared spectra.

The bands of the MH-groups or OH-groups and of the NH—CO-groups which occur with the polyamide disappear with the conversion to polybenzoxazine. On the other hand, a band which is characteristic of the polybenzoxazine is that which is associated with the CO—NH—CO-group. The two accompanying infrared spectra are intended to serve as examples.

It is also possible to prepare copolymers of polyamide benzoxazines by reacting copolyamides, the carboxylic acid component of which consists firstly of bis-o-hydroxyaryl dicarboxylic acid and secondly of a normal dicarboxylic acid or amino carboxylic acid, with a quantity of a carbonic acid derivative which is equimolecular with the quantity of bis-o-hydroxyaryl dicarboxylic acid which is used.

Furthermore, it is possible for only a portion of the hydroxy or amide groups contained in the polyamide to be converted into oxazine rings. In this way, polyamide oxazines are obtained which contain free hydroxy and amide groups.

The polybenzoxazines can be processed from the melt and from solution to provide foils, filaments and other shaped elements and coatings. It is also possible to process the polyamides to form shaped elements or coatings and then to convert them into polybenzoxazine, for example, by adding to a polyamide solution, before processing it into shaped elements, a corresponding quantity of a diaryl carbonate, and processing the solution to give coatings or shaped elements, such as foils or filaments, and thereafter bringing these latter to such a high temperature that there is closure of the ring to form the oxazine with the hydroxyaryl compound being split off.

In this way, compounds of high molecular weight and with the following structure are obtained:

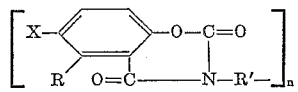

wherein X is the grouping

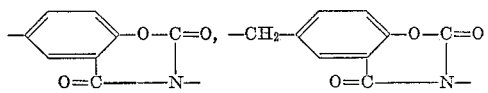

R is hydrogen and X and R are together components of a benzoxazine ring; R' is a divalent aliphatic, cycloaliphatic and aromatic radical and $n$ an integer from 50 to 200.

These high molecular weight polybenzoxazines have melting points of about 200° C. to about 300° C. and an intrinsic viscosity in the range of 1.0 to 1.5, measured from a percent by weight solution of the polybenzoxazine in m-cresol at +25° C. in an Ubbelohde viscosimeter.

The polybenzoxazine diones of high molecular weight are characterised by high melting points, high chemical and thermal resistivity and low solubility in organic solvents. The properties thereof can be varied by choosing different di-o-hydroxyaryl dicarboxylic acids and different diamines.

EXAMPLE 1

(a) Preparation of the polyamide of 4,4'-dihydroxy-3,3'-dimethyldiphenylmethane-5,5' - dicarboxylic acid diphenyl ester and hexamethylene-1,6-diamine.—97.36 g. of 4,4'-dihydroxy-3,3'-dimethyldiphenyl methane 5,5'-dicarboxylic acid diphenyl ester, 24.87 g. of hexamethylene-1,6-diamine and 98.0 g. of cresol (DAB 6) are introduced into a spherical flask provided with a distillation attachment, a receiver and a stirrer device. The apparatus is charged with nitrogen three times, after evacuation at about 20 mm. Hg. The flask is thereafter heated while stirring at normal pressure to 75° C. and the temperature is raised after 15 minutes in each case by 25° C. The temperature is kept for 30 minutes at about 250° C., phenol/cresol being distilled off. The pressure is reduced after 15 minutes in each case by 150 mm. Hg and stirring is continued for another 30 minutes at about 10 mm. Hg. The melt obtained in this way is yellowish and highly viscous. The product obtained after cooling has a relative viscosity of 1.65, measured in 1% solution in cresol at 25° C. The polyamide can be obtained in crystallised form by precipitation from a cresol solution with methanol and then melts at 215° C. It is soluble in dimethyl formamide, tetrahydrofuran, dimethyl sulphoxide, cresol, pyridine or aqueous methanolic sodium hydroxide solution, and is insoluble in ethylene chloride, chlorobenzene and benzene.

(b) Polybenzoxazine.—15.0 g. of the polyamide prepared according to (a) are dissolved in 60 g. of pyridine and while stirring at room temperature. The solution is diluted with 73 g. of o-dichlorobenzene and, while stirring at 3° C. and in 15 minutes, a solution of 13.63 g. of phenyl-chloroformiate (1.15 mol) in 30 g. of o-chlorobenzene is added in 15 minutes. Stirring is thereafter carried out for 2 hours at 50° C., the substance is suction filtered off from the precipitated pyridinehydrochloride, this is diluted with 250 g. of o-dichlorobenzene and 250 g. of solvent are distilled off at a bath temperature of 150° C. and a pressure of about 50 mm. Hg. 150 g. of methanol are added to the remaining solution. After stirring for 30 minutes, the precipitated, crystalline poly-benzoxazine is filtered off and dried at 120° C./20 mm. Hg. The relative viscosity is 1.74, measured under the same conditions as in (a). It melts at 210–215° C. A foil cast from a tetrachlorethane solution is soluble in methylene chloride, cresol and pyridine but is insoluble in ethyl acetate, dimethyl sulfoxide, ethylene chloride, o-dichlorobenzene, dimethyl formamide, tetrahydrofuran and benzene, and the foil, except under the action of the two first-mentioned solvents, becomes cloudy by crystallisation.

EXAMPLE 2

(a) Preparation of the polyamide of 4,4'-dihydroxy-3,3' - dimethyldiphenylmethane - diphenyl - 5,5' - dicarboxylate and m-xylylene diamine.—100.33 g. of 4,4'-dihydroxy-3,3'-dimethyldiphenyl methane diphenyl-5,5'-dicarboxylate (1.0 mol), 30.04 g. of m-xylylene diamine (1.03 mol) and 100 g. of cresol (DAB 6) are prepared as described in Example 1. A highly viscous melt which is pale yellow in colour at 250° C. is obtained. The product has a relative viscosity of 1.63, measured according to Example 1. By precipitation from a cresol solution with methanol, a crystalline product is obtained which melts at 220–225° C. It is soluble in dimethyl formamide, tetrahydrofuran, dimethyl sulphoxide, cresol, pyridine and aqueous methanolic sodium hydroxide solution. It is insoluble in methylene chloride, ethylene chloride, tetrachlorethane, o-dichlorobenzene, benzene.

(b) Polybenzoxazine.—12.5 g. of the polyamide obtained according to (a) are dissolved in 50 g. of pyridine. The solution is diluted with 62.5 g. of o-dichlorobenzene and, while stirring at 2–3° C. a solution of 9.88 g. of phenyl-chloroformate and 25 g. of o-dichlorobenzene is added in 15 minutes. The mixture is heated to 50° C., the reaction mixture solidifying to form a gel. This is kept for 2 hours at this temperature, is then stirred with 100 cc. of methanol and the polybenzoxazine formed precipitates in powder form. It is washed a few times with methanol and dried at 120° C./20 mm. Hg. The product has a relative viscosity of 2.02, measured according to Example 1, and it melts at 240–250° C. A foil cast from a tetrachloroethane solution is soluble in cresol and pyridine, but is insoluble in o-dichlorobenzene, dimethyl formamide, tetrahydrofuran, dimethyl sulphoxide, benzene and acetone.

EXAMPLE 3

(a) Preparation of the polyamide of 4,4'-dihydroxy-3,3' - dimethyldiphenyl methane - 5,5' - diphenyldicarboxylate and bis-p-(2-aminoethyl)-benzene.—97.17 g. of 4,4' - dihydroxy - 3,3' - dimethyldiphenyl methane-5,5'-diphenyldicarboxylate (1.0 mol), 35.11 g. of bis-p-(2-aminoethyl)-benzene (1.03 mol) and 98 g. of cresol (DAB 6) are introduced into a spherical flask having a distillation attachment, receiver and stirrer device. The apparatus is filled 3 times, after evacuation at about 20 mm. Hg with nitrogen. Heating is then carried out while stirring to 75° C. and the temperature is raised after 15 minutes in each case by 25° C. The temperature is kept for 30 minutes at 250° C., phenol/cresol distilling off. The pressure is reduced after 15 minutes by 150 mm. Hg and stirring takes place at 10 mm. Hg after ¾ hour. The product crystallises when about 95% of the phenol-cresol mixture has distilled off, the said product becoming milky and cloudy. A dried specimen which had been dissolved under heat in cresol and re-precipitated with methanol and then dried at 120° C. in vacuo has a melting point of 190–202° C. The relative viscosity is 1.40, measured according to Example 1. Foil cast from a phenol solution is soluble in cresol, pyridine and aqueous methanolic sodium hydroxide solution. It is insoluble in methylene chloride, ethylene chloride, o-dichlorobenzene, dioxane, dimethyl sulphoxide, benzene and acetone, the foil in many cases becoming cloudy by crystallisation.

(b) Polybenzoxazine.—5.7 g. of the polyamide prepared according to (a) are dissolved while stirring at room temperature in 22.8 g. of pyridine. The solution is diluted with 28.5 g. of o-dichlorobenzene and, while stirring at 3–5° C. a solution of 4.05 g. of phenyl chloroformate (1.05 mol) in 20 g. of o-dichlorobenzene is added in 15 minutes.

The reaction product, mixed with pyridine hydrochloride, is separated out from the solution and is partially of pulverous form. 200 cc. of methanol-2-N-hydrochloric acid (2:1) are added, the mixture is stirred for 30 minutes, filtered off with suction and washed 3 times every 30 minutes with water, then twice with methanol and is dried at 120° C./20 mm. Hg. Relative viscosity: 1.88, according to Example 1, melting point: 255–270° C. A film cast from a tetrachlorethane solution is soluble in methylene chloride, cresol but is insoluble in o-dichlorobenzene, dioxane, benzene, acetone and dimethyl sulphoxide, and crystallises in ethylene chloride, dimethyl formamide and tetrahydrofuran.

EXAMPLE 4

Polybenzoxazine dione from 4,4'-dihydroxy-3,3'-dimethyldiphenyl methane-5,5'-diphenyldicarboxylate and 4,4'-diaminodiphenyl methane (a) Polyamide.—35.14 parts by weight of 4,4'-dihydroxy - 3,3' - dimethyldiphenyl methane - 5,5' - diphenyldicarboxylate, 14.94 parts by weight of 4,4'-diaminodiphenyl methane and 30.0 parts by weight of xylenol are introduced into a spherical flask provided with a distillation attachment, receiver and stirrer device. The apparatus is charged with nitrogen three times, after evacuation to about 20 mm. Hg. The temperature is thereafter raised while stirring at normal pressure to 75° C. and the temperature is raised after 15 minutes by 25° C. in each case up to 250° C. The temperature is kept for 2¾ hours at this level and then the pressure is lowered in 2¼ hours to 220 mm. Hg, 39.5 parts by weight of phenol distilled off. The viscous melt solidifies after cooling, is brought to powder form, extracted 3 times with boiling methanol every half an hour and thereafter is dried in vacuo at 100° C. over 24 hours. The product is soluble in tetrahydrofuran, cresol, pyridine and dioxane. It melts at 300–310° C. The relative viscosity is 1.35, measured according to Example 1.

(b) Polybenzoxazine dione.—12.5 parts by weight of the polyamide prepared according to (a) are dissolved at room temperature in 50 parts by weight of pyridine and while stirring. The solution is diluted with 62.5 parts by weight of o-dichlorobenzene, and, while stirring at about 0° C., there is added thereto in 14 minutes a solution of 10.63 parts by weight of phenylchloroformiate in 25 parts by weight of o-dichlorobenzene. The mixture is then stirred for 2 hours at 50° C. After cooling to room temperature, the mixture is stirred with 200 parts by volume of dilute hydrochloric acid, is poured off from the organic layer and stirred with 200 parts by volume of methanol, the polybenzoxazine dione formed precipitating as a powder, which is filtered off with suction and washed neutral with water. It is dried at 120° C. in vacuo over a period of 24 hours. The product is soluble in tetrachlorethane, cresol and pyridine. It melts at 270–285° C. The relative viscosity is 1.45, measured according to Example 1. The product can be cast from solutions, e.g., in tetrachlorethane, to form foils.

EXAMPLE 5

Polybenzoxazine dione of 4,4'-dihydroxy-3,3'-dimethyldiphenyl methane 5,5'-diphenyldicarboxylate and 4,4'-diaminodiphenylether (a) Polyamide.—35.14 parts by weight of 4,4'-dihydroxy - 3,3' - dimethyldiphenyl methane 5,5' - diphenyldicarboxylate, 15.10 parts by weight of 4,4'-diaminodiphenyl ether and 35 parts by weight of phenol are introduced into a spherical flask provided with a distillation attachment, receiver and stirrer device. The apparatus is charged with nitrogen three times after evacuation to about 20 mm. Hg. The flask is thereafter heated while stirring at normal pressure to 75° C. and the temperature is raised by 25° C. after 15 minutes in each case up to 250° C. This temperature is maintained for 2 hours and thereafter the pressure is reduced in ¾ hour to 600 mm. Hg, a total of 43.0 parts by weight of phenol distilling off. The now very viscous melt is cooled, ground and extracted in an extractor for 15 hours. Drying takes place in vacuo at 100° C. for 24 hours. The product is soluble in tetrahydrofuran, cresol, pyridine and dilute sodium hydroxide solution. It melts at 310–330° C. The relative viscosity is 1.41 measured according to Example 1.

(b) Polybenzoxazine dione.—12.5 parts by weight of the polyamide prepared according to (a) are dissolved in 50 parts by weight of pyridine while stirring at room temperature. The solution is diluted with 62.5 parts by weight of o-dichlorobenzene and, while stirring, a solution of 12.98 parts by weight of phenylchloroformiate in 25 parts by weight of o-dichlorobenzene is added at −2° C. The polybenzoxazine dione formed crystallises with formation of a gel. Heating takes place for 2 hours to 50° C. and the substance is then cooled to room temperature, stirred with 200 parts by volume of dilute hydrochloric acid, decanted off from the organic layer and then stirred with 200 parts by volume of methanol. The polybenzoxazine dione, which is now in powder form, is washed neutral with water, washed twice more with methanol and dried at 100° C. in vacuo for 24 hours. It is soluble in tetrachlorethane, cresol and pyridine. It melts at a temperature above 380° C. The relative viscosity is 1.63, measured according to Example 1. The product can be processed from solutions, e.g., in tetrachlorethane, to form foils or filaments.

EXAMPLE 6

Polybenzoxazine dione from 4,4' - dihydroxydiphenyl methane, 5,5'-diphenyldicarboxylate and hexamethylene-1,6-diamine 22.0 parts by weight of 4,4'-dihydroxydiphenyl methane 5,5'-diphenyldicarboxylate, 5.8 parts by weight of hexamethylene-1,6-diamine and 0.534 part by weight of stearylamine are introduced into a spherical flask provided with a distillation attachment, receiver and stirrer device.

The apparatus is charged three times, after evacuation to about 20 mm. Hg with nitrogen. The flask is thereafter heated while stirring at normal pressure to 75° C. and the temperature is raised by 25° C. after 15 minutes in each case. This temperature is maintained for 2 hours, 2.9 parts by weight of phenol distilling off. In this way, a viscous melt of the polyamide is obtained. A sample of the product shows a relative viscosity of 1.39, measured according to Example 1.

21.4 parts by weight of diphenyl carbonate, 0.04 part by weight of N,N'-tetramethylhexamethylene-1,6-diamine and 35 parts by weight of phenol are now added to the melt at 250° C. In 30 minutes, 53.5 parts by weight of phenol distil off from the mixture. The now viscous melt of the forming polybenzoxazine dione solidifies after cooling to form a solid mass, which is dried at 100° C. in vacuo after being ground and extracted with boiling methanol. The product is soluble in tetrachlorethane, cresol and pyridine. It melts at 230–240° C. The relative viscosity is 1.49, measured according to Example 1. Foils or filaments can be obtained from a solution in, for example, tetrachlorethane.

EXAMPLE 7

According to Example 1a the polyamide was prepared from 4,4' - dihydroxy-diphenyl - 3,3 - dicarbonic acid diphenylester, hexamethylene diamine and phenol. Relative viscosity of 1.50. The polybenzoxazine was prepared according to the procedure of Example 1b by treating the polyamide with phenyl chloroformiate in tetrachloroethylene. Relative viscosity: 2.07.

EXAMPLE 8

According to Example 1a the polyamide was prepared by condensing resorcin-2,4-dicarbonic diphenylester with 1,11-diaminoundecan and dihydroxy diphenyl. Relative viscosity: 1.41. The corresponding polybenzoxazine was prepared according to Example 1b treating the polyamide with phenyl chloroformiate in tetrachloroethylene. Relative viscosity: 2.01.

What we claim is:

1. A process for the production of poly-1,3-benzoxazine-2,4-diones having a molecular weight of at least 10,000, which comprises reacting a polyamide from an aromatic di-(o-hydroxyl)-aryl dicarboxylic acid and a diamine with a carbonic acid compound having an acylating action, said reaction being effected at a temperature from 0° to +350° C.

2. The process of claim 1, wherein said carbonic acid compound is diphenylcarbonate.

3. Process as claimed in claim 1, wherein said carbonic acid-polyamide reaction is carried out in the presence of pyridine, in the presence of at least one solvent selected from the group consisting of tetrahydrofuran, dimethylformamide, tetrachlorethane and dichlorobenzene, and in the presence of a catalyst selected from a group consisting of sodium methylate, sodium phenylate and sodium acetate.

4. A process for the production of poly-1,3-benzoxazine-2,4-diones having a molecular weight of at least 10,000, which comprises reacting a polyamide from an aromatic di-(o-hydroxyl)-aryl dicarboxylic acid and a diamine with a carbonic acid compound having an acylating action, said reaction being effected in an organic solvent at a temperature from 0° to +350° C.

5. A process for the production of poly-1,3-benzoxazine-2,4-diones having a molecular weight of at least 10,000, which comprises reacting a polyamide from an aromatic di-(o-hydroxyl)-aryl dicarboxylic acid and a diamine with a carbonic acid compound having an acylating action, said reaction being effected in the presence of a catalyst and an acid-binding agent at a temperature from 0° to +350° C.

6. The process according to claim 5, wherein said carbonic acid compound is phenyl chloroformate.

References Cited

UNITED STATES PATENTS 3,244,675    4/1967    Angelo _____ 260—77.5

WILLIAM H. SHORT, *Primary Examiner.*

L. LEE, *Assistant Examiner.*